United States Patent [19]

Stalego

[11] 4,005,036
[45] Jan. 25, 1977

[54] FROTHED MOLDING COMPOSITIONS
[75] Inventor: Joseph P. Stalego, Newark, Ohio
[73] Assignee: Owens-Corning Fiberglas Corporation, Toledo, Ohio
[22] Filed: Apr. 25, 1974
[21] Appl. No.: 464,100
[52] U.S. Cl. .................. 260/2.5 F; 260/19 R; 260/19 N; 260/18 R; 260/19 A; 260/21; 260/19 UA; 260/23 XA; 260/37 R; 260/38; 260/39 R; 260/829; 260/838; 260/839; 260/847; 260/849; 260/853; 260/2.5 L
[51] Int. Cl.² .................. C08J 9/30; C08L 61/04; C08L 61/24; C08L 61/34
[58] Field of Search ............. 260/2.5 F, 2.5 L
[56] References Cited
UNITED STATES PATENTS 2,664,406 12/1953 Armstrong ............... 260/2.5 F
3,023,136 12/1962 Himmelheber et al. ........ 260/2.5 F
3,062,682 11/1962 Morgan et al. ............. 260/2.5 F
3,645,926 2/1972 Dunlop .................... 260/2.5 L Primary Examiner—Wilbert J. Briggs, Sr.
Attorney, Agent, or Firm—John W. Overman; Patrick P. Pacella

[57] ABSTRACT

Frothed molding compositions comprising a film of uncured binder uniformly dispersed throughout a fibrous matrix, wherein the molding composition is frothed in the presence of frothing agents of salts of fatty acids, are disclosed. These frothed molding compositions can be used in molding doors, panels and miscellaneous shapes for structural and furnishing applications.

13 Claims, No Drawings

FROTHED MOLDING COMPOSITIONS

This invention relates to frothed molding compositions. More particularly, the frothed molding compositions comprise a film of uncured binder uniformly dispersed throughout a fibrous matrix.

The art has long appreciated that incorporation of fibrous materials in thermoplastic or thermosetting molded articles improves the structural properties of such articles. In particular, glass reinforced plastics have been used for years with the glass fibers being incorporated in various forms, depending upon the type of molding operation, design and end use of the molded article. Recently, the art recognized that glass fibers of very short length that is, having a length as short as 10–100 times the fiber diameter, can be used in a convenient fashion when incorporated with a resin. The composite short fiber-resin molding material can be conveniently extruded, injection molded, or used in a compression mold and handled as a single composition. The fibers, prior to chopping, can be treated with a protective vehicle such as a cured phenolic resin. Hammermilled virgin fibers (shorter lengths) or picked virgin fibers (longer lengths) also can be used.

Frothed molding compositions now have been discovered. The frothed molding compositions comprise a film of uncured binder uniformly dispersed throughout a fibrous matrix. The frothing agents employed are salts of fatty acids. The froth generally is molded and cured to the B-stage prior to use. The resulting material can be compressed to form boards, preferably while warm to conform the composition to the mold pattern. Heat then is applied to advance the resin cure into the C-stage. These frothed molding compositions exhibit good body and consistency, are formed quickly and cure with minimal shrinkage. These frothed molding compositions can be used in molding doors, panels and miscellaneous shapes for structural and furnishing applications where good strength characteristics and surface detail are desired. Some of these applications include sheathing, soffits, house siding, acoustical tile, vibration dampeners, fire barriers, automotive body parts, sound deadeners and the like.

Accordingly an object of this invention is to provide frothed molding compositions comprising a film of uncured binder uniformly dispersed throughout a fibrous matrix wherein the molding composition is frothed in the presence of frothing agents of salts of fatty acids.

Other objects, aspects and advantages of this invention will be apparent to one skilled in the art from the following disclosure and appended claims.

The uncured binder of this invention generally is an uncured phenolic resin.

The resin can be a phenol-formaldehyde condensate, a phenol-aminoplast-formaldehyde condensate, an aminoplast-formaldehyde condensate, a furfuryl condensate a furfuryl alcohol condensate or a resorcinol-formaldehyde condensate. Alkyd, epoxy, furan and polyester resins also can be used. The amino-plast are materials such as urea, melamine and dicyandiamide. Phenol-formaldehyde condensates, phenol-aminoplast-formaldehyde condensates and aminoplast-formaldehyde condensates are preferred.

In general, the phenol-formaldehyde condensate is produced by initially reacting more than 1 mole of formaldehyde per mole of phenol in an aqueous system in the presence of an alkaline catalyst. If a phenol-aminoplast-formaldehyde condensate is produced a first reaction or condensation product of a formaldehyde-phenol resole is produced. After the free formaldehyde content in the reactor is reduced to a certain percentage, for example, 6–12 (by weight of the formaldehyde and phenol), the aminoplast is charged to the same reactor and reacted with the free formaldehyde to form a second condensation product, an aminoplast-formaldehyde resole. These resole reaction products are cooled and neutralized to stop the condensation reactions prior to completion.

The fibers of this invention include glass fibers, mineral wool, asbestos, organic materials and the like.

The organic fibers can be cellulosic fibers such as fibers of wood pulp, cotton, straw, bagasse, wood bark, hemp, rayon, coir, excelsior, and the like.

The fibers generally have a fiber diameter of 30 microns or less, as in the case of cotton fibers, and may average less than 1 micron in fiber diameter as in the case of wood pulp. Glass fibers will generally have a diameter of less than 0.001 inch and have a length of from 1/64 to 2.0 inch, desirably from 1/16 to 1.00 inch, and preferably from ⅛ to ½ inch.

Preferably, the fibers have a mean diameter ranging from 0.00025 to 0.00050 inches and a mean length ranging from 10 to 100 times their mean diameter. If desired, a protective vehicle comprising particles of a cured resin can be adhered to the fibers.

The frothing agents are ammonium, amine, sodium, potassium or lithium salts of fatty acids. The ammonium salts of fatty acids are preferred with ammonium stearate being most preferred.

In one embodiment, the frothed molding compositions can contain a thermoplastic resin such as polyvinyl chloride, polyvinyl chloride-acrylic copolymers, polyvinyl chloride copolymers containing reactive carboxyl groups or amide groups, acrylics or reactive acrylics containing carboxyl radicals. Other resins that can be employed are acrylonitrile-butadiene-styrene, cellulose acetate, polyethylene, crosslinked polyethylene, silicone, polybenzimidazole, polyurethane, polyesters, epoxy, polypropylene, polycarbonates, polysulfones, polyesters, nylon, styrene, butadiene, and the like. Still other thermoplastic resins include alkyds, furans, urethanes, acetals, nitriles, organic oxides, organic sulfides and the like.

Gels such as cellosize, carbopols, acrysols and the like can be employed so the frothed molding compositions do not collapse.

Filler materials such as hollow glass micro-balloons, clays, minerals, perlite, vermiculite, fly ash, volcanic ash, bentonites, aluminum flakes, stainless steel flakes, other metallic flakes and the like also can be used.

Water repellency can be achieved by incorporating a hydrophobic material in the froth batch. Specific hydrophobic materials include silicone, metallic stearate, chromium stearate complexes, waxes, oils and the like.

The molding composition also can contain optional amounts of an aminoplast such as melamine, urea or dicyandiamide.

The amount of uncured binder, fiber and thermoplastic resin used in this invention can vary widely. Generally and preferred amounts are:

| Material | Percent by Weight of Solids | | | |
|---|---|---|---|---|
| | General | | Preferred | |
| Uncured Binder | 35 to | 95 | 55 to | 85 |
| Fibers | 5 to | 65 | 15 to | 45 |
| Thermoplastic Resin | 0 to | 60 | 0 to | 30 |

The uncured binder and frothed agent are blended together along with the aminoplast and thermoplastic resin if employed. The blend then is warmed to 100° to 130° F to form a fatty acid soap. The gelling agent is added and the resulting blend is frothed in a mixer. The fibers are added and the blend again is frothed by mixing. If desired the blend can be prefrothed by mixing prior to the addition of the gelling agent and fibers.

The froth now is ready for molding and curing by conventional means.

Various mats, fabrics, papers, films and the like can be applied to the face of the froth, generally during molding. The facings seal the foam and provide an attractive surface which is generally harder and more impact resistant than the froth itself. Dusting or electrostatically applying clays, minerals, metal platelets and the like powders also can be used to seal and toughen the surface of the froth.

The advantages of this invention are illustrated by the following examples. The reactants, proportions and other specific conditions are presented as being typical and should not be construed to limit the invention unduly.

EXAMPLE I

A phenol-aminoplast-formaldehyde condensate was prepared as follows:

| Ingredients | Parts by Weight |
|---|---|
| Formladehyde (52%) | 52.0 |
| Phenol | 27.3 |
| Barium Monohydrate | 3.4 |
| Dicyandiamide | 1.4 |
| Urea (solid) | 4.1 |

The phenol and formaldehyde were charged to a reactor, blended and heated to a temperature of 110° F. The barium catalyst then was added over a two hour period while maintaining the temperature at 110° F. The temperature of the reactants was increased to 125° F over a 30 minute period and then maintained at that temperature for an additional 90 minutes. The temperature then was raised to 140° F during a time period of 30 minutes and maintained at that temperature until the free formaldehyde content ranges from 7.0 to 7.2 percent by weight. The dicyandiamide was added over a 30 minute period at 140° F and the reaction continued for 30 minutes while dropping the temperature to 120° C. Urea was added and the reaction was cooled to 100° F and neutralization followed when the temperature dropped below 100° F by addition of sulfuric acid (20 percent concentration by weight in water) to a pH ranging from 7.2 to 7.3.

EXAMPLE II

A froth using the resin of Example I was prepared as follows:

| Ingredients | Weight, Grams |
|---|---|
| uncured phenolic resin of Ex.1 | 332 (50% solution) |
| urea | 42 |
| polyvinyl chloride latex | 332 (52% solution) |
| cellosize | 45 |
| stearic acid | 40 |
| water | 250 |
| ammonia | 34 |
| fibers* | 332 |

*glass fibers having a mean diameter of 0.00040 inches and an average length of 10 to 100 times the fiber diameter wherein 0.5 to 10% by weight of cured phenolic resin is adhered to the fibers.

The uncured phenolic resin, urea, polyvinyl chloride latex, ammonia and stearic acid were blended and then warmed to 110°–120° F to form an ammonia stearate soap. The mixture then was prefrothed by mixing, cellosize was added, and the blend was again frothed by mixing. The treated fibers were added and the blend was again frothed by mixing.

The froth had excellent body and volume and frothed easily under agitation.

EXAMPLE III

The froth of Example II was placed in a mold while still in the green A-stage and heated in an oven at 180° F for 16 hours to dry and cure the molding composition to the B-stage.

EXAMPLE IV

The material of Example II was compressed at a temperature of 500° F and a pressure of 422 psi to form boards cured to the C-stage.

No slumping was observed during the cure of Example III or Example IV. Little or no shrinkage occured during curing.

EXAMPLE V

A phenol-aminoplast-formaldehyde condensate was prepared as follows.

| Ingredients | Parts by Weight | Mol Ratio |
|---|---|---|
| Formaldehyde (52%) | 104.00 | 3.3 |
| Phenol | 51.34 | 1 |
| Calcium Hydroxide | 3.60 | |
| Melamine | 1.30 | |
| Urea (solid) | 15.20 | |

The phenol and formaldehyde were charged to a reactor, blended and heated to a temperature of 100° F. The calcium oxide catalyst then was added over a three hour period while maintaining the temperature at 100° F. The temperature of the reactants was increased to 125° F over a 30 minute period and then maintained at that temperature for an additional 90 minutes. The temperature then was raised to 140° F during a time period of 30 minutes and maintained at that temperature until the free formaldehyde content ranges from 8.0 to 8.2 percent by weight. The melamine as added over a 30 minute period at 150° F and the reaction was cooled to 105° F while adding the urea as fast as possible. Neutralization followed when the temperature dropped below 100° F by addition of oxallic acid to a pH ranging from 7.4 to 7.6, 20 percent concentration by weight in water.

EXAMPLE VI

A froth using the resin of Example V was prepared as follows.

| Ingredients | Weight, Grams |
| --- | --- |
| uncured phenolic resin of Ex.V | 640 (50% solution) |
| dicyandiamide | 90 |
| ammonia | 40 |
| stearic acid | 31 |
| acrylic resin | 246 (50% solution) |
| collosize | 18 |
| water | 530 |
| fibers* | 250 |

*Glass fibers having a mean diameter of 0.00040 inches and an average length of 10 to 100 times the fiber diameter wherein 0.5 to 10% by weight of cured phenolic resin is adhered to the fibers.

The uncured phenolic resin, dicyandiamide, acrylic resin, ammonia and stearic acid were blended and then warmed to 140° F to form an ammonia stearate soap. The mixture then was prefrothed by mixing, cellosize was added, and the blend was again frothed by mixing. The treated fibers were added and the blend was again frothed by mixing.

The froth had excellent body and volume, and frothed easily under agitation.

EXAMPLE VII

The froth of Example VI was placed in a mold while still in the green A-stage and heated in an oven at 180° F for 16 hours to dry and cure the molding composition to the B-stage.

EXAMPLE VIII

The material of Example VII was compressed at a temperature of 500° F and a pressure of 422 psi to form boards cured to the C-stage.

No slumping was observed during the cure of Example VII or Example VIII. Little or no shrinkage occured during curing.

While the invention has been described in considerable detail, we do not wish to be limited to the particular embodiments shown and described and it is our intention to cover hereby all novel adaptations, modifications and arrangements thereof which come within the practice of those skilled in the art to which the invention relates.

I claim:

1. A frothed molding composition consisting essentially of a film of an uncured binder uniformly dispersed throughout a fibrous matrix of fibers wherein the molding composition is frothed in the presence of a frothing agent of salts of fatty acids wherein the composition comprises 35 to 95% by weight of solids of binder and 5 to 65% by weight of solids of fibers and wherein the uncured binder is a phenol-formaldehyde condensate, a phenol-aminoplast-formaldehyde condensate, an aminoplast-formaldehyde condensate, a furfuryl condensate, a furfuryl alcohol condensate, or a resorcinol-formaldehyde condensate.

2. A frothed molding composition according to claim 1 wherein the composition comprises 55 to 85% by weight of solids of uncured binder and 15 to 45% by weight of solids of fibers.

3. A frothed molding composition according to claim 1 wherein the aminoplast is urea, melamine or dicyandiamide.

4. A frothed molding composition according to claim 1 wherein the uncured binder is a phenol-formaldehyde condensate, a phenol-aminoplast-formaldehyde condensate or an aminoplast-formaldehyde condensate.

5. A frothed molding composition according to claim 1 wherein the fibers are glass fibers.

6. A frothed molding composition according to claim 1 wherein the fibers have a mean diameter ranging from 0.00025 to 0.00050 inches and a mean length ranging from 10 to 100 times their mean diameter.

7. A frothed molding composition according to claim 1 wherein particles of cured resin are adhered to the fibers.

8. A frothed molding composition according to claim 1 wherein the frothing agents are ammonium amine, sodium, potassium or lithium salts of fatty acids.

9. A frothed molding composition according to claim 1 wherein the frothing agents are ammonium salts.

10. A frothed molding composition according to claim 1 wherein the frothing agent is ammonium stearate.

11. A frothed molding composition according to claim 1 including 0 to 60% by weight of solids of thermoplastic resins.

12. A frothed molding composition according to claim 11 wherein the composition comprises 0 to 30% by weight of solids of thermoplastic resins.

13. A frothed molding composition according to claim 11 wherein the thermoplastic resins are polyvinyl chloride, polyvinyl chloride-acrylic copolymers, polyvinyl chloride copolymers containing reactive carboxyl groups or amide groups, acrylics or reactive acrylics containing carboxyl radicals.

* * * * *